United States Patent [19]

Speranza et al.

[11] Patent Number: 5,341,709
[45] Date of Patent: Aug. 30, 1994

[54] PORTABLE VERTICAL BORING MACHINE

[75] Inventors: Richard J. Speranza, Jeannette; Richard A. Speranza, Export, both of Pa.

[73] Assignee: Speranza Specialty Machining, Export, Pa.

[21] Appl. No.: 992,482

[22] Filed: Dec. 17, 1992

[51] Int. Cl.⁵ .............................................. B23B 5/00
[52] U.S. Cl. ...................................... 82/1.11; 82/1.4; 82/122
[58] Field of Search ....................... 408/87, 88, 93, 94, 408/105, 107, 108, 236; 82/1.11, 1.2, 1.4, 1.5, 122; 409/143

[56] References Cited

U.S. PATENT DOCUMENTS

| | | | |
|---|---|---|---|
| 591,411 | 10/1897 | Mann | 82/1.2 |
| 834,218 | 10/1906 | Riddell | 82/122 |
| 2,648,999 | 8/1953 | Stephan | 408/234 |
| 2,674,925 | 4/1984 | Berthiez | 408/234 |
| 2,699,694 | 1/1955 | Schraub | 408/234 |
| 3,158,065 | 11/1964 | Korenek et al. | 82/122 |
| 3,750,496 | 8/1973 | Ivanov et al. | 82/1.5 |
| 4,155,280 | 5/1979 | Armitage | 82/122 |
| 4,189,953 | 2/1980 | Volk | 74/479 |
| 4,193,317 | 3/1980 | Oono et al. | 74/479 |
| 4,270,404 | 6/1981 | Murakoshi et al. | 74/479 |
| 4,341,128 | 7/1982 | Murakoshi et al. | 74/479 |
| 4,372,223 | 2/1983 | Iwatani | 108/143 |
| 4,409,860 | 10/1983 | Moriyama et al. | 74/479 |
| 4,628,756 | 12/1986 | Kimura et al. | 74/479 |
| 4,632,615 | 12/1986 | Yamamura | 408/234 |
| 4,648,723 | 3/1987 | Sugiyama et al. | 384/9 |
| 4,729,536 | 3/1988 | Scala | 248/429 |
| 4,972,574 | 11/1990 | Isono et al. | 29/740 |
| 4,978,233 | 12/1990 | Stotzel et al. | 384/12 |
| 5,040,431 | 8/1991 | Sakino et al. | 74/479 |
| 5,115,354 | 5/1992 | Iwase | 359/873 |
| 5,197,361 | 3/1993 | Carrier et al. | 82/1.4 |

FOREIGN PATENT DOCUMENTS

| | | |
|---|---|---|
| 751514 | 12/1978 | U.S.S.R. |
| 1118488 | 10/1984 | U.S.S.R. |
| 29087 | 1/1897 | United Kingdom |
| 991286 | 5/1965 | United Kingdom |
| 1297891 | 11/1972 | United Kingdom |

OTHER PUBLICATIONS

Portable Boring Bar Model 1162 Brochure By Climax (4 pages).
Portable Boring Bar Model 1680 Brochure By Climax (4 pages).

Primary Examiner—Daniel W. Howell
Attorney, Agent, or Firm—James L. Sherman

[57] ABSTRACT

A vertical boring machine is for boring or facing a circular region of a component having a central axis and includes a horizontal support for supporting the component with the central axis extending in a vertical direction. A tool support is disposed for rotation at the central axis to extend in said vertical direction. The tool support includes a tool head extending radially outwardly of the central axis which is configured for controlled radial movement and for controlled axial movement. The vertical boring machine preferably includes a mechanism for selectively moving the base of the tool support in an X direction and in a Y direction relative to the horizontal support aligning the tool support with the central axis. The X direction and Y direction are in a horizontal plane and perpendicular to each other. The tool support can be maintained in a fixed position relative to the horizontal support, after the aligning of the tool support with the central axis, to secure the tool support at the central axis during the boring or facing of the component. There is included a method of boring or facing a circular region of a component having a central axis by supporting the component horizontally and rotating a tool support disposed at the central axis.

18 Claims, 4 Drawing Sheets

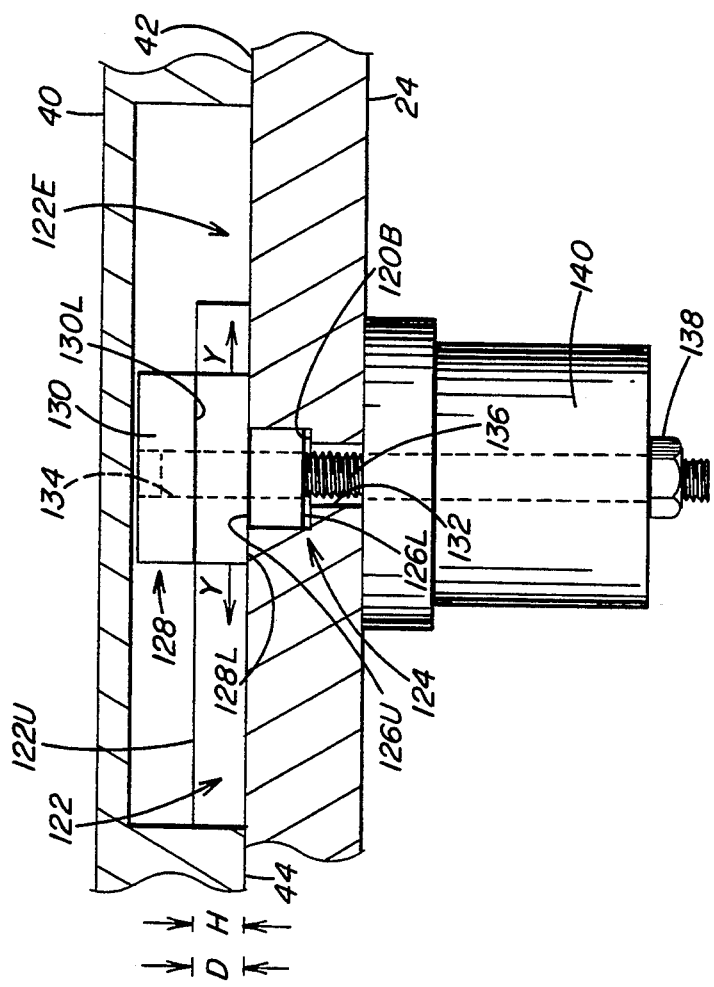
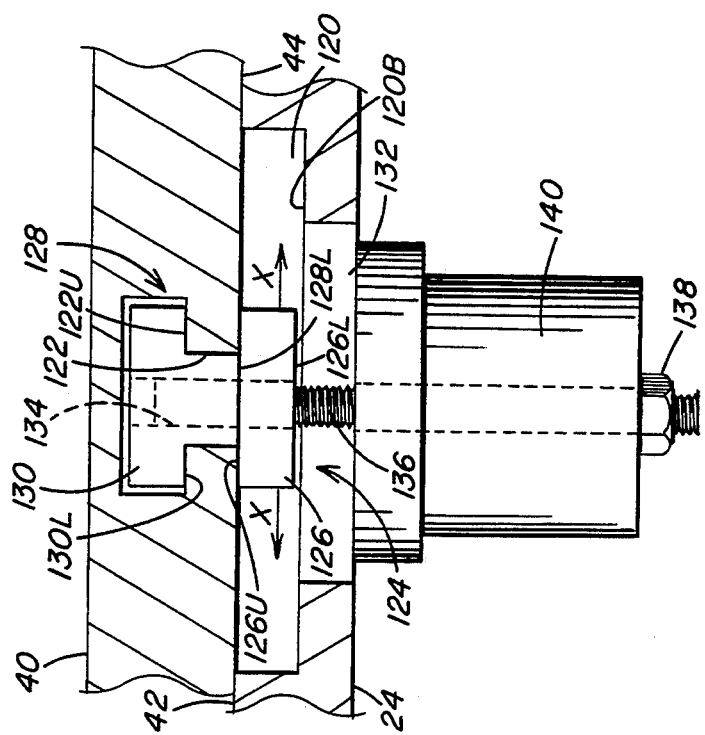
FIG. 4
FIG. 3

PORTABLE VERTICAL BORING MACHINE

BACKGROUND OF THE INVENTION

1. Field of the Invention

This invention relates to a portable vertical boring machine and, more specifically, to such a machine which is capable of boring and/or facing a circular region of large circular components or other work pieces which have central axis which are disposed vertically during the boring and/or facing process. The preferred machine is portable and capable of being transported to various locations for on-site boring and/or facing of various circular components or work pieces.

2. Description of the Prior Art

The preferred portable vertical boring machine is configured to bore and/or face large circular regions of various work pieces such as large turbine diaphragm rings or the like which typically have inside diameters ranging between 22 inches and 140 inches. Because of the large size of such components, it is not uncommon for the boring and/or facing process to be performed on large machines permanently installed at remote locations. Consequently, when a large turbine or the like must be overhauled, many major components must be disassembled and shipped to the remote location for being reworked prior to reassembly. Typically, such large boring and/or facing machines located at remote locations are configured to include a centrally disposed boring or facing component with a large rotating support table to which the circular component or work piece is attached. Accordingly, the relative circular movement between the boring and/or facing tool and the work piece is produced by rotating the support table about the relatively "fixed" tool supporting component. The means for driving the support table for such large circular components or work pieces are relatively complicated and must include means for accurately locating the circular component or work piece thereon in order to insure accurate boring and/or facing of the surfaces thereof. With these large machines including secure means for maintaining the "fixed" tool supporting component relative to the support table, the overall configuration prevents them from being moved from their permanent locations to perform any on-site boring and/or facing of the work pieces.

Consequently, although such machines work quite satisfactorily and provide accurate boring and/or facing of large circular components or work pieces, the overall process and procedure is considered relatively expensive because of the extensive down time of the turbine or the like during overhaul and the cost of shipping the various large work pieces to such remote locations.

As a result, there have also been utilized a number of portable boring bars which can be brought to the site for boring the work pieces. Such portable boring bars tend to be mounted horizontally or vertically through various means to generally provide for the boring of such large circular components or work pieces as they are "mounted" within the turbine housing or the like being overhauled. For example, Portable Boring Bars, Model Nos. 1162 and 1680, manufactured by Climax Portable Machine Tools, Inc. of Newberg, Oreg., are utilized for on-site boring of such large circular components or work pieces. Generally, such portable boring bars are mounted to the housing of a turbine, the housing of a large valve or the like for proper support and alignment during the boring and/or facing of the work pieces being retained within the housing. If the internal gland seals of a larger turbine diaphragm ring are to be bored, the portable boring bar may, for example, be directly secured to the diaphragm ring during the boring of the internal gland seals.

During the use of such portable boring bars, the work pieces may be maintained in a fixed position with the axes thereof being horizontally disposed within the housing or in a secure location on the floor of the site. For large valves or the like which are disposed vertically, the portable boring bar would be maintained is a fixed position within the housing with the axes thereof extending vertically. The portable boring bars are typically attached to both ends of the housing, diaphragm ring or the like to allow the rotating boring tool means to be advanced through the housing or diaphragm ring for the boring of the interior surfaces of the work pieces. Clearly, in order to accurately bore the work pieces, the portable boring bars must be accurately located with respect to the housing or diaphragm ring. The proper alignment of both Model Nos. 1162 and 1680 of the Portable Boring Bars manufactured by Climax Portable Machine Tools, Inc. requires the proper adjustment of various types of mounting spindles which are employed at each end of the housing or diaphragm ring.

Again, although such portable boring bars have been satisfactorily and successfully employed in the past, there may be certain disadvantages resulting from the manner in which the portable boring bars are mounted. For example, although some facing of annular surfaces on the circular components or work products is possible, because of the manner in which the rotating boring head is mounted to the housing or diaphragm ring, there could be limited access to the ends of the housing and the ends of some of the components mounted therein or to the ends of the diaphragm ring to which the boring machine is secured.

Although such portable boring bars eliminate the need for the circular components to be shipped to a remote location, retaining some of the work pieces within a housing could prevent access to the housing which would otherwise be desirable during the overhauling process. In other words, although a housing may appear to be a convenient means for supporting the portable boring bars in some instances, as a practical matter during the overhauling process of some turbines or the like, it often desirable to have unrestricted access to the housing to perform various other tasks essential during an overhaul of the turbine or the like.

Although there exists a number of permanent vertical boring and/or facing machines and a number of portable boring bars of the type described above, many patents are directed to the more common permanent horizontal boring, facing and/or milling machines. On the other hand, British Patent No. 29,087; Russian Patent No. 751,514; and Russian Patent No. 1,118,488 do disclose machines which might be capable of producing some vertical boring. For example, British Patent No. 29,087 discloses a portable machine which appears to have means for producing horizontal and vertical movement of the tool means which could result in vertical boring or the like. Russian Patent No. 751,514 discloses a device for drilling holes in a cylindrical and conical shell. The drill head tends to extend horizontally but is capable of being moved vertically and even has a feature for providing an inclined angle to the drilling head for the drilling of the tapered portion of the shell. Russian Patent No. 1,118,488 discloses a precision vertical boring and milling machine which has hydrostatic bearings to enable the head stock to be transversed in vertical and horizontal directions through the use of three separate hydraulic circuits.

However, a significant number of patents are directed to various large horizontal boring, facing and/or milling machines which are typically not portable and include rigid mounting means to minimize vibrations or bending which occur during the boring, facing and/or milling process.

British Patent No. 991,286 discloses a horizontal boring and milling machine which has a vertical column which might be capable of limited rotation about the vertical axis but is preferably rigidly secured to a fixed base. The primary features of the machine include various supporting surfaces for movement in a horizontal direction and various slotting and clamping means to insure that the work piece is rigidly maintained in the desired position during the boring and/or milling. British Patent No. 1,297,891 discloses a horizontal jig-boring machine which can be moved in a horizontal direction and includes means for facilitating the horizontal movement on a rigid base for the entire machine.

U.S. Pat. Nos. 2,648,999; 2,674,925; 2,699,694; and 4,632,615 disclose heavy-duty boring, drilling and/or milling machines which are typical in the prior art. Most of these devices bend to product boring in a horizontal direction but do have the capability of producing vertical movement of the boring head. It is significant to note that the machines shown in these patents include rigid means for supporting and moving the boring and/or milling heads in two directions along the horizontal and in a vertical direction. In other words, such machines require rigid supporting means and reliable means for translating the boring and/or milling head in various directions.

While the boring and/or facing machine of the present invention will be seen to be configured different from those generally disclosed hereinabove, it is significant to note that one feature which will assist in the boring and/or facing operation of the preferred machine includes the ability to provide convenient, accurate and reliable positioning of the rotating boring and/or facing component relative to the fixed circular component or work piece. In other words, a significant feature includes the capability of fixedly mounting the circular component or work piece on a support frame while adjusting the boring or facing component to be centrally located relative to the fixed circular component or work piece. Consequently, any means which can be used to produce reliable movement in a horizontal plane in both an X and Y direction is of interest. Clearly, some such features have been provided to some of the machines disclosed in U.S. Pat. Nos. 2,648,999; 2,674,925; 2,699,694; and 4,632,615.

However, a number of other patents disclose specific means for producing accurate and reliable movement within the horizontal plane in X and Y directions which are perpendicular to each other. While such means are of interest, it should be noted that the preferred means for centrally locating the boring and/or facing component of the preferred invention with respect to the fixed circular component or work piece does not require the type of controlled or continuously adjustable movement in the X and Y directions that many components in the prior art may require. Nevertheless, a review of various means for producing movement in the X and Y direction within a horizontal plane may be of interest. For example, U.S. Pat. Nos. 4,189,953; 4,193,317; 4,270,404; 4,341,128; 4,372,223; 4,409,860; 4,628,756; 4,648,723; 4,729,536; 4,972,574; 4,978,233; 5,040,431; and 5,115,354 disclose various means for producing controlled movement of a component within a horizontal plane in both the X and Y directions. However, most of the devices disclosed therein include some form of base support with upwardly disposed rails, guide rods or roller means for the support of an intermediate element to allow the intermediate element to be moved in, for example, the X direction. The intermediate element in turn includes some form of rails, guide rods or roller means for the support of an upper element to facilitate movement of the upper element in the Y direction relative to the intermediate element. Consequently, accurate movement of the upper element is accomplished through the combined movement of the intermediate element with respect to the base support and the upper element with respect to the intermediate element. While all of these devices may present configurations which are satisfactory for the purposes intended, it should be noted that the various rails, guide rods or roller configurations are relatively complicated and may not be desirable for use in such a heavy duty boring and/or facing machine of the present invention.

Specifically, the preferred means for providing the X-Y adjustment of the central boring and/or facing component of the present invention is the subject of a patent application, entitled "An X-Y Movement Mechanism", which was filed on the same date as the present application by the same inventor and has been assigned to the same assignee. Consequently, while the disclosure of the feature for centrally aligning the preferred boring and/or facing component of the preferred machine is disclosed herein, additional alternative configurations are included in the co-pending application filed on the same date as the present application.

SUMMARY OF THE INVENTION

It is an object of the present invention to provide a boring and/or facing machine which is portable and capable of being used on-site for the boring and/or facing of circular regions of large components having a central axis.

It is another object to provide such a machine in which the component is supported in a fixed horizontal position with the central axis extending in a vertical direction.

It is still another object to provide such a machine in which the tool support extends generally vertically for rotation about the central axis.

It is yet another object to provide such a machine with a configuration for moving the tool support in the X and Y directions in the horizontal plane relative to the fixed component to insure alignment of the tool support, and the axis of rotation thereof, with the central axis.

It is a further object to provide such a machine with a locking device to secure the alignment of the tool support with the central axis throughout the boring and/or facing operation after the tool support has been moved in the X and Y direction.

These and other objects of the invention are provided in a preferred embodiment thereof including a vertical boring machine for boring or facing a circular region of a component having a central axis. The preferred boring machine includes horizontal support for supporting the component with the central axis extending in a vertical direction. A tool support is for being disposed at the central axis to extend in the vertical direction. Apparatus is provided for rotating the tool support about the central axis. The tool support includes a tool head extending radially outwardly of the central axis. The tool support has tool head movement devices for controlled radial movement of the tool head and for controlled axial movement of the tool head in the vertical direction.

The preferred horizontal support includes a center support with the tool support mounted on the center support for relative rotation therebetween. The horizontal support also includes a plurality of radially extending leg elements. Each of the radially extending leg elements has an upper surface, each radially extending leg element is removably secured to the center support, and the radially extending leg elements include devices for securing the component to the upper surfaces thereof. The center support and each of the radially extending leg elements include adjustable feet elements for positioning of the upper surfaces in a horizontal plane and the central axis in the vertical direction which is perpendicular to the horizontal plane.

The preferred vertical boring machine includes a tool support base. The tool support is mounted for rotation about said tool support base. The apparatus for rotating the tool support is secured to and supported by the tool support base. The tool support base is mounted on the center support.

The vertical boring machine can further include a configuration for selectively moving the tool support base in an X direction and in a Y direction relative to the center support. The X direction and the Y direction are in a horizontal plane and at an angle with respect to each other and the configuration for selectively moving the tool support base is for aligning the tool support with the central axis. A locking device can be provided for maintaining the tool support base in a fixed position relative to the center support after the aligning of the tool support with the central axis to secure said tool support at the central axis during the boring or facing of the component.

In the preferred vertical boring machine, the tool support base includes lower surface portions, the center support includes upper surface portions, and the lower surface portions and upper surface portions include at least one region of sliding contact therebetween when the tool support base is mounted on the center support. The region of sliding contact between the lower surface portions and the upper surface portions preferably extends in a common plane which is parallel to the horizontal plane.

The preferred upper surface portions include an upper horizontal surface and the preferred lower surface portions include a lower horizontal surface. The preferred configuration for selectively moving the tool support base includes at least one first groove in the upper horizontal surface which extends in the X direction and at least one second groove in the lower horizontal surface which extends in the Y direction. At least a portion of the first groove is generally aligned with the second groove. At least one X-Y guide member extends into the first groove and the second groove with a lower portion of the X-Y guide member disposed in and for sliding along the first groove and an upper portion disposed in and for sliding along the second groove.

The preferred vertical boring machine further includes a locking device for selectively maintaining the lower horizontal surface in a fixed position on the upper horizontal surface after the aligning of the tool support base with the central axis. The preferred second groove is T-shaped. The upper portion of the X-Y guide member includes an enlarged upper region for sliding, interlocking disposition within the second groove. The locking device includes a configuration for applying a force to the X-Y guide member in a downward direction to cause the enlarged upper region within the second groove to produce frictional contact between the upper horizontal surface and the lower horizontal surface.

The vertical boring machine can include the configuration for selectively moving the tool support base with a plurality of X-Y guide members, a plurality of first grooves and a plurality of second grooves. Each of the first grooves would be generally aligned with a corresponding second groove. Each X-Y guide member would respectively extend into each first groove and each corresponding second groove. The plurality of first grooves and plurality of second grooves would be evenly spaced about the tool support means. The first grooves, second grooves and X-Y guide members are substantially confined between the tool support base and the center support as the region of sliding contact between the lower horizontal surface and the upper horizontal surface completely encircles the first grooves, second grooves and X-Y guide members.

In the preferred vertical boring machine, the configuration for selectively moving the tool support base also includes an X-adjustment device and a Y-adjustment device. The X-adjustment device includes a first adjustable coupling between the center support and the tool support base for varying a relative distance therebetween in the X direction. The Y-adjustment device includes a second adjustable coupling between the center support and the tool support base for varying a relative distance therebetween in the Y direction. The first adjustable coupling can include a rotatable screw element extending in the X direction and supported by the center support. A nut element is supported by the tool support base. The rotatable screw element is operably engaged with the nut element. Components for rotating the rotatable screw element produce movement of the nut element in the X direction. The preferred nut element is supported by the tool support base in a manner which allows relative movement therebetween in the Y direction.

Additional objectives of the invention are provided by a preferred method of boring or facing a circular region of a component having a central axis. The method includes the steps of:

supporting the component in a fixed position in a horizontal plane with the central axis extending in a vertical direction;

disposing a tool support element at the central axis to extend in the vertical direction with a tool head of the tool support element extending radially outwardly of the central axis;

rotating the tool support element about the central axis; and selectively moving the tool head in a radial direction and in an axial direction relative to the central axis to produce the boring or facing of the circular region.

In the preferred method of boring or facing, the step of disposing the tool support includes selectively moving the tool support element, relative to the component in the fixed position in a horizontal plane, in an X direction and in a Y direction which are parallel with the horizontal plane and at an angle with respect to each other.

BRIEF DESCRIPTION OF THE DRAWINGS

FIG. 3 is a sectional view of the preferred machine as seen along line III—III of FIG. 5 which extends in the X direction.

FIG. 4 is a sectional view of the preferred machine as seen along line IV—IV of FIG. 5 which extends in the Y direction.

DETAILED DESCRIPTION OF THE PREFERRED EMBODIMENTS

Figure 1:
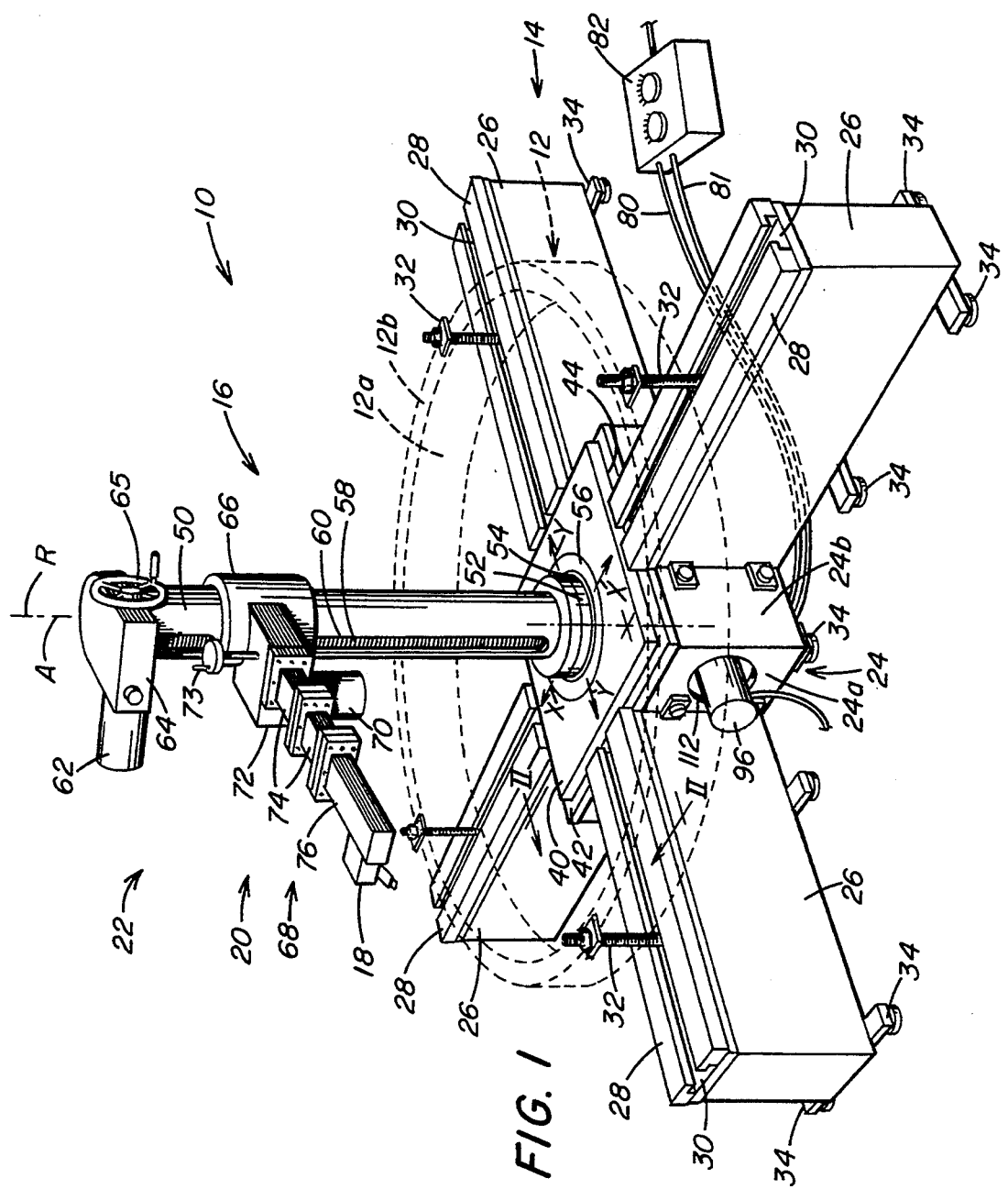
FIG. 1 is a perspective view of a preferred boring and/or facing machine including various features of the invention.

As seen in FIGS. 1 through 5, a preferred vertical boring machine 10 of the present invention is for circular boring and/or facing a component 12 (shown in phantom) in a circular region thereof having a central axis A. The circular region could, for example, include an internal cylindrical region 12a or an annular region 12b at the end of the component 12. The preferred boring machine 10 includes a horizontal support means 14 for supporting the component 12 with the central axis A thereof extending in a vertical direction. The machine 10 will be seen to be capable of boring the cylindrical region 12a and capable of facing the annular region 12b of the component 12.

When properly adjusted for the boring and/or facing operation, the vertical boring machine 10 further includes tool support means 16 for being disposed at the central axis A to also extend in the vertical direction. There is further provided, as discussed hereinbelow, means for rotating the tool support means 16 about an axis of rotation R which coincides with the central axis A. The tool support means 16 includes a tool head 18 which is disposed to extend radially outwardly of the axis of rotation R and central axis A. The tool support means 16 includes radial tool head movement means 20 for controlled radial movement of the tool head 18 and axial tool head movement means 22 for controlled axial movement of the tool head 18 in the vertical direction.

Generally, the preferred horizontal support means 14 includes a center support frame 24 with the tool support means 16 mounted on the center support frame 24 for relative rotation therebetween. Additionally, the horizontal support means 14 includes a plurality of radially extending base legs 26. Preferably, four such radially extending base legs 26 on the preferred vertical boring machine 10 are each removably bolted and otherwise secured to the respective side walls 24a, 24b, 24c, and 24d of the center support frame 24. As will be seen, the overall vertical boring machine 10 is configured for easy disassembly and reassembly in order to allow the vertical boring machine 10 to be conveniently transported to various locations for on-site boring or the like.

Each of the radially extending base legs 26 includes an upper surface 28 which is configured with a T-shaped channel 30 or the like. Consequently, attachment means 32 can be adjustably moved along the T-shaped channel 30 of each leg 26 and securely attached thereto for rigidly supporting, locating and positioning the component 12 to cause the central axis A to extend in the vertical direction. To insure that the horizontal support means 14 is level and properly balanced on any floor at the various sites at which the preferred vertical boring machine 10 might be utilized, the center support frame 24 and the radially extending base legs 26 include a plurality of adjustable feet 34.

It should be noted that a typical component 12, as generally shown in phantom in FIG. 1, could include a diaphragm ring of the type which is utilized in large steam turbines. The diaphragm rings are typically secured within the housing of the turbine and include gland seals extending inwardly thereof to closely encircle the turbine shaft in order to provide sealing between the various stages of the turbine. During the overhaul of a turbine, it is not uncommon for new gland seals to be provided to the diaphragm rings. In order to properly size the new gland seals, the preferred vertical boring machine 10 can be utilized to generally bore the internal cylindrical region 12a thereof to produce the close tolerances between the gland seals and the turbine shaft which are required for the desired sealing between the stages of the turbine.

Additionally, as will be seen, the preferred vertical boring machine 10 is configured to produce controlled facing of various annular surfaces or circular regions 12b of a component 12, such as the end surfaces of the turbine blade or diaphragm rings. The preferred vertical boring machine 10, although capable of being used for various components associated with turbines, could be utilized for numerous components 12 which can be secured to the machine 10 for the boring of various cylindrical surfaces or the facing of various annular surfaces thereof. In fact, the manner of supporting and securing the component 12 to the preferred horizontal support means 14 allows access to relatively small cylindrical surfaces and to relatively large radial or annular surfaces in a more convenient manner than would be possible with the portable boring bars of the types described hereinabove.

The preferred vertical boring machine 10 has an overall configuration and manner of operation for use at various sites in a manner which is more convenient and versatile than the portable boring bars of the type described above. The features which allow the machine 10 to be portable are not included in the more permanent boring machines of the type described hereinabove. The preferred vertical boring machine 10 includes additional features which will further insure the convenient and reliable boring and/or facing of the components 12.

Specifically, while the preferred vertical boring machine 10 includes means for rotating the tool support means 16 about the central axis A, the operation as thus described assumes that the component 12 can be properly positioned and secured to the upper surfaces 28 of the base legs 26 in a manner which will allow easy and convenient location of the central axis A to coincide with the center of rotation R of the tool support means 16. While the attachment means 32 could be selectively adjusted along the T-channels 30 in an attempt to properly locate the component 12 with respect to the center of rotation R of the tool support means 16, such adjustment is relatively complicated. In fact, as mentioned above, the proper adjustment of various types of mounting spindles at both ends of a housing or the like tends to significantly complicate the use of the portable boring bars of the prior art.

Consequently, the preferred vertical boring machine 10 includes a tool support base 40 which is mounted for movement on the upper region of the center support frame 24 and the tool support means 16 is mounted for rotation about the tool support base 40. The means for rotating the tool support means 16 is also secured to and supported by the tool support base 40. In the preferred configuration, the center support frame 24 includes a upper horizontal surface 42 with the tool support base 40 having a lower horizontal surface 44. With the lower horizontal surface 44 being disposed for movement on the upper horizontal surface 42, the entire tool support means 16 is capable of movement relative to the horizontal support means 14 to insure that the axis of rotation R thereof can be properly aligned with the central axis A of the component 12. In other words, prior to the beginning of the boring and/or facing operation, the component 12 can be rigidly secured to the upper surfaces 28 of the base legs 26 in general alignment around the center support frame 24. However, alignment of the tool support means 16 is accomplished by the relative movement of the tool support base 40 on the center support frame 24 to insure proper, accurate boring and/or facing of the component 12 without the necessity of the component 12 itself being finely "adjusted" on the horizontal support means 14.

Prior to an explanation of the means by which the tool support base 40 is adjusted with respect to the horizontal support means 14, it is appropriate to explain the preferred operation of the vertical boring machine 10 for producing the desired boring and/or facing of the surfaces of the component 12. In other words, assuming that the axis of rotation R of the tool support means 16 is properly aligned with the central axis A of the component 12 and that the tool support means 16 is capable of being rotated about the central axis A, there must be means for producing the controlled radial and axial movement of the tool head 18 as it rotates around the circular component 12. The preferred tool support means 16 includes a rotatable vertical boring shaft 50. The vertical boring shaft 50 is bolted to a spindle 52 which extends through an opening 54 in an adjustable bearing housing 56 which forms a upper part of the tool support base 40. The spindle 52, as best seen in FIG. 2, extends below the tool support base 40 for causing the entire boring shaft 50 to be rotated by rotating means 53 in a manner which will be discussed in detail hereinbelow.

In order to produce the desired movement of the tool head 18 in both the radial and axial directions relative to the boring shaft 50, the tool support means 16 includes the radial tool head movement means 20 and the axial tool head movement means 22, as best seen in FIG. 1. The preferred axial tool head movement means 22 includes a vertical quill feed screw 58 which extends axially along the vertical boring shaft 50 within a vertical groove 60. The vertical quill feed screw 58 is mounted to be rotated by a vertical quill feed motor 62 through an associated reduction and motion translation gear assembly 64. The means for utilizing the vertical quill feed motor 62 through the reduction and motion translation gear assembly 64 is well known in the boring and machining art. With proper electrical controls, the feed motor 62 is capable of producing selective rotation of the vertical quill feed screw 58 to cause "upward" or "downward" movement of the threads thereof. The rotation of the feed screw 58 is intended to produce selective vertical movement of a tool arm spindle 66 supported by the vertical boring shaft 50. The tool arm spindle 66 encircles the vertical boring shaft 50 and is keyed to the vertical groove 60 with the vertical quill feed screw 58 threadably extending therethrough. Accordingly, selective operational movement by the vertical quill feed motor 62, in either direction, will produce a corresponding vertical movement of the tool arm spindle 66. The vertical reduction and motion translation gear assembly 64 includes means for selectively engaging and disengaging the vertical quill feed motor 62. The gear assembly 64 includes a hand crank 65 which can be used when the feed motor 62 is disengaged for manual adjustment of the tool arm spindle along the vertical boring shaft 50.

The tool arm spindle 66 operably supports a radial tool arm 68 which extends outwardly of the vertical boring shaft 50. The radial tool head movement means 20 is associated with the radial tool arm 68 and includes another quill feed screw (not shown) and an associated radial quill feed motor 70 and reduction and motion translation gear assembly 72. The selective operation of the radial quill feed motor 70 through the gear assembly 72 will result in selective inward or outward radial movement of the tool head 18 mounted on the radial tool arm 68 in a manner which is well known to those skilled in the boring and machining art. The preferred radial tool arm 68 is configured to include removable sections 74 which may be selectively installed and/or selectively removed to vary the overall length of the radial tool arm 68. If the radius of the component 12 to be bored and/or faced is relatively small, the sections 74 can be removed to cause the radial tool arm 68 to only include the basic extended end portion 76 housing the radial quill feed screw (not shown) and supporting the tool head 18 thereon. With the sections 74 removed, the limited radial movement of the tool head 18 will be appropriately disposed near the vertical boring shaft 50 for components 12 having a smaller radius. On the other hand, if the component 12 has a significantly larger radius, additional and/or larger sections 74 can be installed in the radial tool arm 68 between the spindle 66 and the basic extended end portion 76 in order to locate the tool head 18 at a greater distance from the vertical boring shaft 50. The sections 74 include internal rotating components (not shown) which are mated one to the other to transfer the rotating motion produced by the radial quill feed motor 70 and the gear assembly 72 to the radial quill feed screw (not shown) within the basic extended end portion 76 for selective radial movement of the tool head 18 along the end portion 76 of the arm 68. As with the vertical gear assembly 64, the radial gear assembly 72 includes means for selectively engaging or disengaging the radial quill feed motor 70. A hand crank 73 may be utilized when the feed motor 70 is disengaged for manual radial adjustment of the tool head 18 along the tool arm 68.

Figure 2:
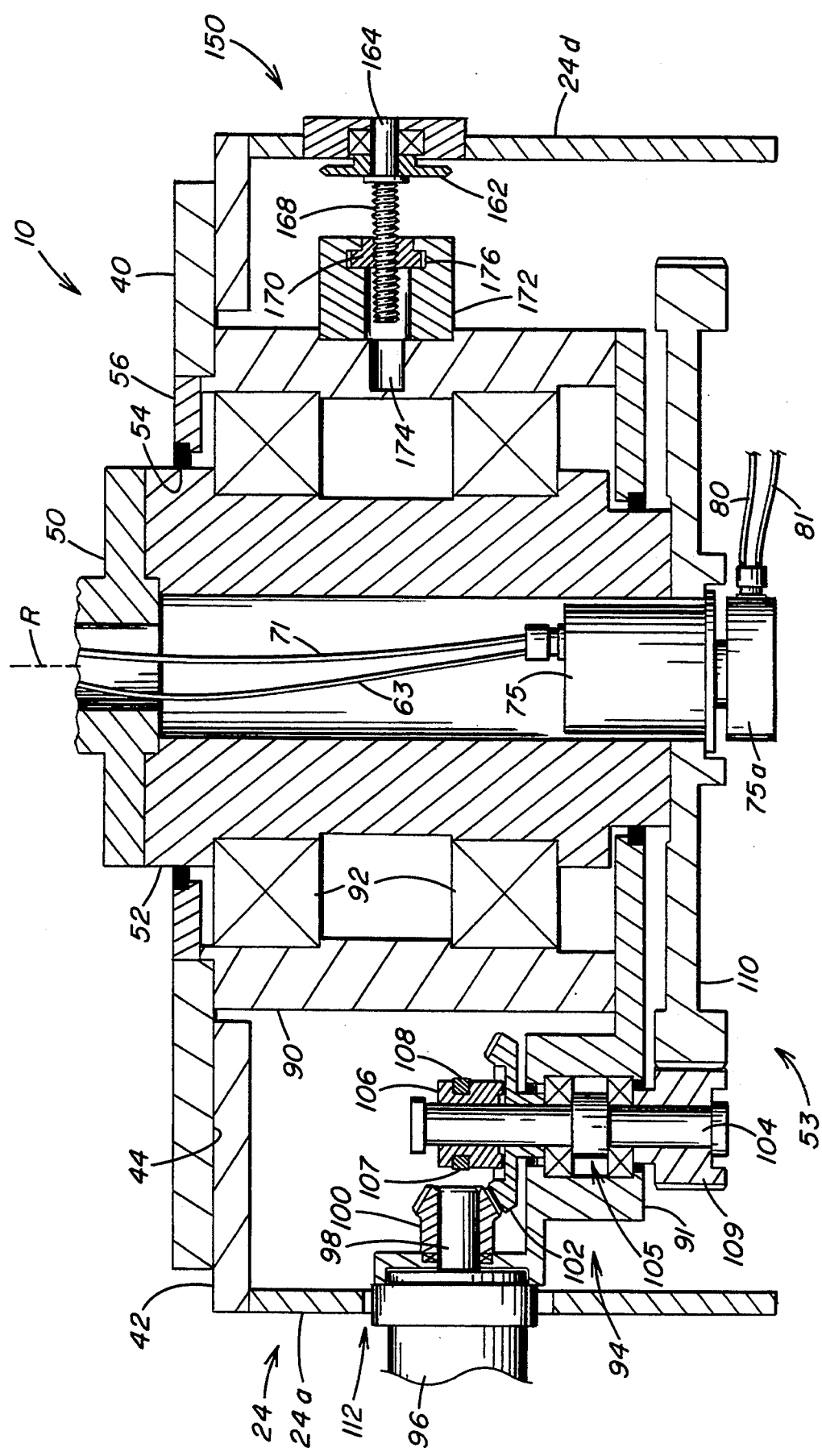
FIG. 2 is a sectional view of the machine of FIG. 1 as generally seen along line II—II of FIG. 1.

As best seen in FIG. 2, operating power for the vertical quill feed motor 62 and the radial quill feed motor 70 is respectively provided through electrical wiring 63, 71 which extends through the interior of the vertical boring shaft 50. The electrical wiring 63, 71 within the rotating shaft 50 is connected to the rotating portion of a collector ring assembly 75 in the lower region of the spindle 52. The fixed portion 75a of the collector ring assembly 75 includes wiring 80, 81 which extends from below the center support frame 24 to a control box 82 (FIG. 1). The control box 82 receives power from an external source and includes means for selectively adjusting the speed and direction to each of the vertical quill feed motor 62 and the radial quill feed motor 70. The control box 82 includes means for selecting the direction of rotation and the speed of rotation of each of the motors 62 and 70 in order to be able to selectively adjust the vertical movement of the tool arm spindle 66 and/or the radial movement of the tool head 18. With a component 12 properly secured to the upper surface 28 of the horizontal support means 14, the control box 82 can be utilized, when the vertical boring shaft 50 is rotating, to selectively move the tool head 18 in the radial and/or vertical directions.

With there being provided means for controlling the tool head 18 through the axial tool head movement means 22 and the radial tool head movement means 20, it is appropriate to understand the preferred rotating means 53 for the vertical boring shaft 50. As indicated hereinabove, the vertical boring shaft 50 is mounted on the spindle 52 extending through the opening 54 in the adjustable bearing housing 56 of the tool support base 40. As best seen in FIG. 2, the tool support base 40 includes a spindle housing 90 which rigidly extends downwardly from the lower horizontal surface 44. The spindle housing 90 supports a pair of thrust bearings 92 which, in turn, support the major portion of the spindle 52 below the tool support base 40 and within the spindle housing 90.

The spindle housing 90 includes an extended bracket means 91 which supports some of the components of a spindle drive assembly 94 of the preferred rotating means 53. A hydraulic motor 96 of the spindle drive assembly 94 includes an output shaft 98 with a drive bevel gear 100 mounted thereon. The drive bevel gear 100 is operably engaged with a driven bevel gear 102 which is mounted for rotation around an intermediate region of a spur gear shaft 104. The spur gear shaft 104 is mounted to rotate about bearings 105 which are supported by the extended bracket means 91. Keyed for axial movement upwardly and downwardly on the upper end of the spur gear shaft 104 is an engagement hub 106. A spindle drive yoke 107 engages a yoke bushing within a cylindrical groove 108 of the engagement hub 106. Selective upward and downward movement of the spindle drive yoke 107 will produce corresponding movement of the engagement hub 106 along the upper end of the spur gear shaft 104. By use of a pneumatic cylinder (not shown), the spindle drive yoke 107 can be moved upwardly to disengage the engagement hub 106 from the driven bevel gear 102. When the engagement hub 106 is disposed upwardly to effectively uncouple the driven bevel gear 102 from the spur gear shaft 104, the hydraulic motor 96 is effectively disconnected from the spindle 52 to allow free rotation of the spindle 52 and vertical boring shaft 50 mounted thereon.

However, with the pneumatic cylinder (not shown), which is mounted on and supported by the extended bracket means 91, operated to allow the spindle drive yoke 107 to be disposed downwardly, the engagement hub 106 will engage the driven bevel gear 102 to effectively couple the driven bevel gear 102 with the spur gear shaft 104. A spur gear 109 is mounted on the opposite, lower end of the spur gear shaft 104. Secured to the lower end of the spindle 52 is a relatively large spindle drive gear 110 which is in operative engagement with the spur gear 109. When the engagement hub 106 is lowered for engaging the driven bevel gear 102 with the shaft 104, operation of the hydraulic motor 96 will produce corresponding rotation of the spur gear 109 to cause the spindle drive gear 110, and thus the spindle 52, to rotate. The general support of the spindle drive assembly 94 including the motor 96 and shaft 104 by the extended bracket means 91 of the spindle housing 90 enables proper rotation of the spindle 52 and vertical bearing shaft 50 independently of the location of the tool support base 40 on the center support frame 24.

The hydraulic motor 96 is preferred for producing rotation of the spindle 52 and vertical boring shaft 50 because the relative size and weight thereof would be less than a comparable electrical motor capable of producing a variable speed of rotation in either direction. As thus described, the vertical boring machine 10 is portable because of the capability of removing the radially extending base legs 26 from the center support frame 24 and, further, because of the capability of removing the vertical boring shaft 50 and associated components thereof from the upper end of the spindle 52. In other words, the entire machine 10 may be disassembled and reassembled for convenient transportation to various sites for the desired boring and/or facing operation.

The explanation provided hereinabove for selective rotation of the vertical boring shaft 50 and for selective movement of the tool head 18 supported thereon assumes that the axis of rotation R of the vertical boring shaft 50 coincides with the central axis A of the component 12 which is to bored and/or faced. However, the attachment of the component 12 to the upper surface 28 through the attachment means 32 will not conveniently insure that the central axis A thereof will be properly aligned with the vertical boring shaft 50 without complicated and inconvenient adjustment of the various attachment means 32. Accordingly, the tool support base 40 is configured to be capable of movement on the center support frame 24 as the lower horizontal surface 44 thereof is selectively moved on the upper horizontal surface 42 of the center support frame 24.

Although other lower surface portions and other upper surface portions might be used to generally produce a region of sliding contact between the tool support base 40 and the center support frame 24, the surfaces 42, 44 are preferred. The contact between the upper horizontal surface 42 and the lower horizontal surface 44 lies within a common horizontal plane around the spindle housing 90 to produce a significant frictional area therebetween. As seen in FIGS. 1 and 2, the hydraulic motor 96 of the spindle drive assembly 94 is configured to extend through an enlarged opening 112 in the side wall 24a of the center support frame 24. While the upper portion of the tool support base 40 is mounted above the center support frame 24, the spindle housing 90 and the various components which are supported thereby are generally housed within the center support frame 24. However, the components basically secured to the tool support base 40 are independent of the center support frame 24 to allow relative movement therebetween. Nevertheless, although there can be some relative movement between the tool support base 40 and the components supported thereby and a center support frame 24, the movement is preferably limited to horizontal movement in an X and Y direction, as indicated by the arrows X and Y, without any rotational movement therebetween. Although the drive motor 96 extends through the enlarged opening 112 in the side wall 24a of the center support frame 24, any significant rotational movement between the tool support base 40 and the center support frame 24 could cause the hydraulic motor 96 to be brought into undesired contact with the center support frame 24. Further, controlled movement of the center of rotation R is easier and more reliable when measurements and adjustments are limited to the X and Y directions. While the preferred X direction and Y direction are perpendicular to each other, it is most significant that the X and Y direction be disposed at an angle with respect to each other. Those skilled in the art will recognize the general advantage of disposing the X-direction and Y-direction perpendicular to each other but will understand that other angles could be selected without departing from the scope of the invention as claimed.

In order to limit the relative movement between the tool support base 40 and the center support frame 24 in the X and Y directions without any relative rotation therebetween, the upper horizontal surface 42 and the lower horizontal surface 44 include means for insuring the desired relative movement between the tool support base 40 and the center support frame 24. Specifically, as seen in FIGS. 3 and 4, the upper horizontal surface 42 includes directional control means in the form of a plurality of grooves 120 extending in the Y direction. On the other hand, the lower horizontal surface 44 includes a plurality of grooves 122 which extend in the Y direction. The alignment of the grooves 120, 122 are such that a portion of each groove 122 overlies a corresponding one of the grooves 120. Basically, mounted between the lower horizontal surface 44 and the upper horizontal surface 42, for installation within each of the grooves 120 in the X direction and a corresponding groove 122 in the Y direction, is an X-Y guide member 124. Each of the X-Y guide members 124 includes a lower portion 126 and an upper portion 128. The lower portion 126 is elongated to extend in the X direction for sliding movement within the groove 120. The upper portion 128 is elongated to extend in the Y direction for sliding movement within the groove 122. In other words, with the X-Y guide member 124 installed in both of the grooves 120 and 122, the relative movement between the tool support base 40 and the center support frame 24 is limited to movement which will allow the X-Y guide member 124 to move in the X direction along the groove 120 and the tool support base 40 to move in the Y direction, relative to the upper portion 128 of the X-Y guide member 124, along the groove 122. Accordingly, selective relative movement of the tool support base 40 is possible in either the X or Y direction on the center support frame 24.

There are preferably included four such grooves 120 in the upper horizontal surface 42 and four corresponding such grooves 122 in the lower horizontal surface 44 with four such X-Y guide members 124 therebetween. The four X-Y guide members 124 and grooves 120, 122 are evenly dispersed about the spindle housing 90 at the corners of the tool support base 40 and the center support frame 24, as indicated at G in FIGS. 1 and 5. The use of the four X-Y guide members 124 tends to insure the smooth relative movement between the tool support base 40 and center support frame 24 in the X and/or Y directions without any relative rotation therebetween.

In the preferred machine 10, the cross section of the groove 122 is not identical to the cross section of the groove 120. The preferred X-Y guide member 124 includes a T-shaped upper region 130 of the upper portion 128. Consequently, the groove 122 is also generally T-shaped in order to allow the upper region 130 to be retained within the groove 122. One end 122E of the groove 122 is enlarged to allow the upper portion 128 to be installed within the groove 122 during assembly.

It should also be noted that the groove 120 does not simply extend into the upper horizontal surface 42 but includes an elongated hole 132 in the lower region thereof. The preferred X-Y guide member 124 includes a threaded hole 134 extending vertically therethrough for the receipt of bolt means 136. Bolt means 136 in turn includes an adjustable nut 138 at the lower end thereof. Specifically, the mounting of the X-Y guide member 124 within the grooves 120, 122 allows bolt means 136 to extend through the hole 132 to a region below the upper portion of the center support frame 24.

Mounted around bolt means 136 between the upper portion of the center support frame 24 and the nut 138 is a hydraulic clamping cylinder 140. Accordingly, activation of the hydraulic clamping cylinder 140 will produce downward movement on the nut 138 and corresponding downward movement of the X-Y guide member 124. When the X-Y guide member 124 is pulled downwardly, the T-shaped upper region 130 will act upon the T-shaped groove 122 to firmly clamp the lower horizontal surface 44 into firm contact with the upper horizontal surface 42. The substantial region of contact and the force created by the four X-Y guide members 124 produces significant frictional forces to prevent any continued relative movement between the tool support base 40 and the center support frame 24. Consequently, while the preferred X-Y guide members 124 will allow selective movement of the tool support base 40 relative to the center support frame 24, once the desired positioning of the base 40 on the frame 24 is obtained, activation of the hydraulic clamping cylinders 140 will prevent any continued relative movement therebetween in order to insure that the axis of rotation R of the vertical boring shaft 50 continues to coincide with the center axis A of the component 12 throughout the boring and/or facing operation.

It should be noted that the substantial region of contact between the upper horizontal surface 42 and the lower horizontal surface 44 completely encircles the grooves 120, 122 and the X-Y guide member 124 installed therein throughout the movement in the X and Y directions. Consequently, the preferred configuration includes the grooves 120, 122 and the X-Y guide members 124 being substantially confined between the tool support base 40 and center support frame 24. This feature is particularly attractive and advantageous for use in the preferred vertical boring machine 10 because of the nature of the boring and/or facing operation. The boring and/or facing of a component 12 will result in small shavings or chips of material that could collect in and interference with the continued reliable operation of the X-Y guide members 124 within the grooves 120, 122. The preferred confinement of the grooves 120, 122 and X-Y guide members 124 allows them to be maintained in a clean, reliable manner throughout the use of the machine 10 as any lubricating means which is used to facilitate movement between the members remains uncontaminated.

Alternative means for the X-Y guide member 124 and the grooves 120, 122 might be employed to limit the movement of the tool support base 40 on the center support frame 24 to the X and Y directions. Such alternative means are disclosed in the co-pending application entitled "An X-Y Movement Mechanism", which was filed on the same date as the present application by the same inventor and assigned to the same assignee as discussed hereinabove. However, as best seen in FIGS. 3 and 4, there are some relative dimensions for the preferred X-Y guide member 124 and grooves 120, 122 which insure the desired operation as described. For example, the lower surface 126L of the lower portion 126 of the X-Y guide member 124 should not rest upon or make contact with a base 120B of the groove 120 or a region around the elongated hole 132. Such contact should be prevented to insure the lower portion 126 will not apply any force to the center support frame 24 when the hydraulic clamping cylinder 140 is activated. Further, the upper surface 126U of the lower portion 126 should be disposed below the upper horizontal surface 42 to prevent any contact with the lower horizontal surface 44 as the tool support base 40 is moved on the center support frame 24.

Still further, the lower surface 128L of the upper portion 128 of the X-Y guide member 124 should be disposed within the groove 122 above the lower horizontal surface 44 to insure that the upper portion 128 does not interfere with the movement of the tool support base 40. This is primarily assured by the height H of the upper portion 128 from the lower surface 128L to the upper region 130 being equal to or slightly less than the depth D of the groove 122 to the enlarged portion thereof. The preferred vertical dimensions will insure that the only contact in the vertical direction between the X-Y guide member 124 and the grooves 120, 122 is located at the lower surface 130L of the upper region 130 of the upper portion 128 as it overlies and rests upon the upper surface 122U of the enlarged portion of the T-shaped groove 122. The sides of the lower portion 126 and upper portion 128 of the X-Y guide member 124 will respectively be in sliding contact with the side walls of the grooves 120 and 122 to insure the desired movement in the X and Y directions. However, the vertical dimensions of the preferred X-Y guide member 124 will limit the contact in a vertical direction to that which is between the lower surface 130L of the upper region 130 and the upper surface 122U of the enlarged portion of the T-shaped groove 122. Consequently, the lower horizontal surface 44 of the base 40 remains in contact with the upper horizontal surface 42 of the support 24 and nothing restricts or prevents the clamping force from being applied to the surfaces 44, 42 during the boring and/or facing operation.

Figure 5:
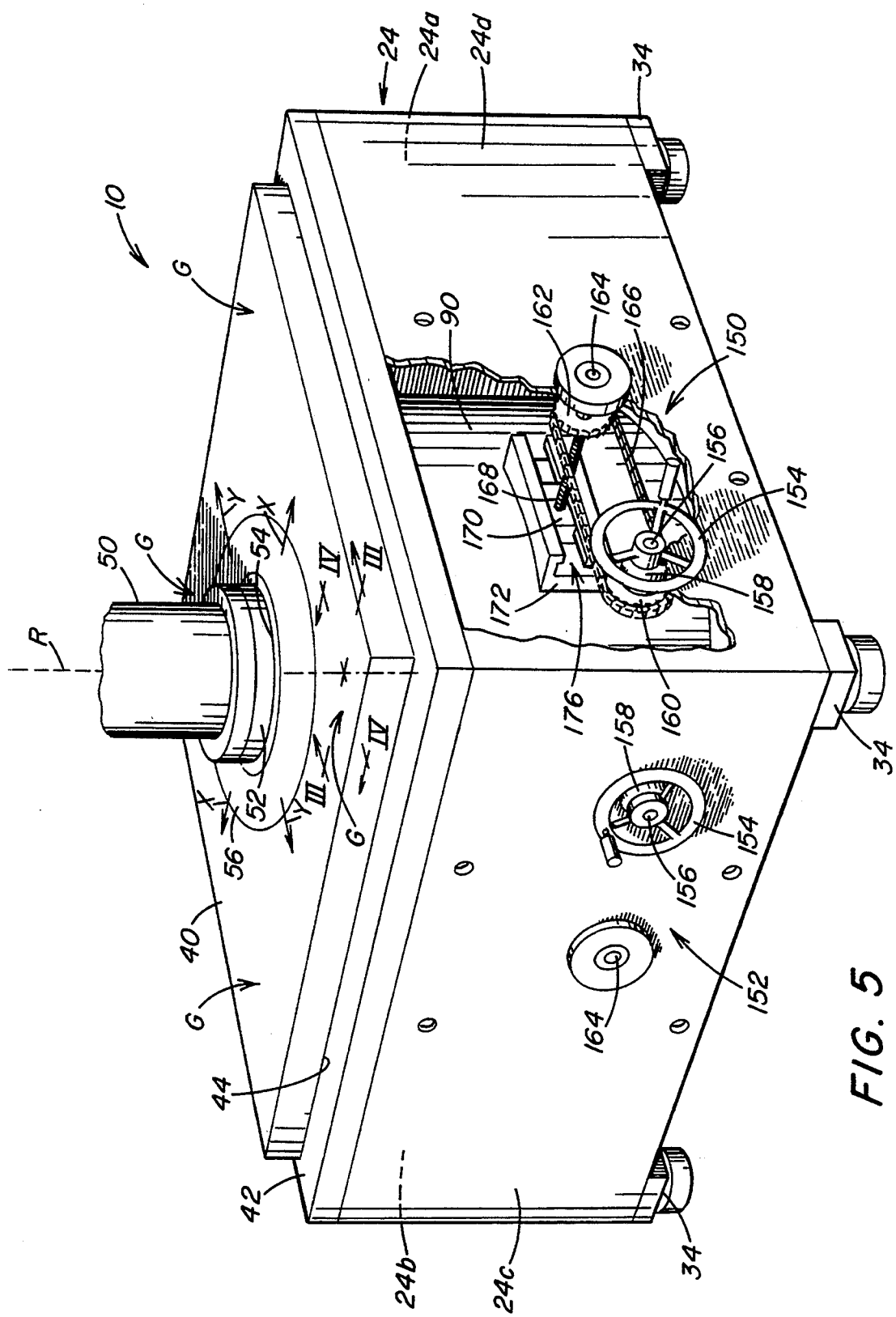
FIG. 5 is a fragmentary, perspective view of the other side of the machine as seen in FIG. 1 with the extended leg elements removed to show other features of the invention.

As thus described, it would be possible to produce movement of the tool support base 40 in the X and/or Y direction on the center support frame 24 by any reasonable means. For example, a hammer or the like could be used to tap one side or the other of the tool support base 40 to produce the desired movement on the center support frame 24. On the other hand, as best seen in FIGS. 2 and 5, the preferred vertical boring machine 10 includes selective X adjustment means 150 and Y adjustments means 152 for convenient and reliable movement of the tool support base 40 on the center support frame 24 until the desired position of the vertical boring shaft 50 is obtained. The X adjustment means 150 and Y adjustment means 152 are identical in operation and are basically installed between the center support frame 24 and the spindle housing 90 respectively at side walls 24d and 24c at locations which are 90 degrees apart. Movement produced by the X adjustment means 150 will produce movement of the tool support base 40 in the X direction while similar movement of the Y adjustment means 152 will produce similar such movement of the tool support base 40 but in the Y direction. Consequently, an explanation of the X adjustment means 150 will be sufficient for an understanding of how relative adjustments can be made in either the X or the Y direction.

The preferred X adjustment means 150 includes a rotatable hand crank 154 which is installed on the end of a shaft 156 which is mounted within a bearing housing 158 on the side wall 24d of the center support frame 24. The other end of the shaft 156 extends into the interior of the center support frame 24 for rotation of a drive sprocket 160 mounted thereon. A driven sprocket 162 is located centrally of side wall 24d of the center support frame 24 in a region generally aligned with one of the radially extending base legs 26. The driven sprocket 162 is keyed to a shaft 164 which is mounted for rotation at the interior of the side wall 24d. The driven sprocket 162 is rotated by a connecting chain 166 when the drive sprocket 160 rotates. The shaft 164 includes a threaded portion 168 which extends toward the spindle housing 90 and includes a T-nut 170 threadably mounted thereon (FIG. 2). The T-nut 170 is installed within an adjusting block 172 rigidly mounted to the side of the spindle housing 90. The spindle housing 90 includes an enlarged opening 174 (FIG. 2) aligned with the adjusting block 172 for loose, non-contacting disposition of the end of the threaded portion 168 of the shaft 164 therein. The adjusting block 172 includes a T-slot 176 for supporting the T-nut 170. Rotation of the hand crank 154 will produce corresponding rotation of the drive sprocket 160. As the drive sprocket 160 rotates, the connecting chain 166 between the drive sprocket 160 and driven sprocket 162 will cause rotation of the threaded portion 168 of the shaft 164. As the threaded portion 168 rotates, the T-nut 170 will be advanced or retracted on the threaded portion 168 in order to produce pushing or pulling movement in the X direction of the spindle housing 90 relative to the center support frame 24.

The sliding disposition of the T-nut 170 within the T-slot 176 is necessary in order to allow similar such movement in the Y direction through the Y adjustment means 152. In other words, after the spindle housing 90, and thus the tool support base 40, has been properly adjusted in the X direction through the use of the X adjustment means 150, the similar Y adjustment means 152 can be utilized to produce pushing or pulling movement of the spindle housing 90 in the Y direction. The movement in the Y direction will not be restricted or prevented because of the coupling of the T-nut 170 and the T-slot 176 which allows relative movement therebetween in the Y direction. The movement in the Y direction will not be restricted by the end of the threaded portion 168 within the relatively large opening 174 or the T-nut 170 which simply slides along the T-slot 176 until the desired location in the Y direction is produced. The movement in the Y direction will not alter the position of the adjusting block 172, spindle housing 90, or tool support base 40 in the X direction.

The hand crank 154 of the X adjustment means 150 on the side wall 24d and/or the hand crank 154 of the Y adjustment means 152 on the side wall 24c will enable the machine operator to produce fine, selective movement of the vertical boring shaft 50 relative to the component 12. It should be understood that, if the engagement hub 106 is raised so that the drive gear 110 is disconnected from the hydraulic motor 96, the tool arm 68 and tool head 18 may be rotated by hand to various positions about the component 12 until the desired location of the tool support base 40 and vertical boring shaft 50 on the center support frame 24 is determined. After the operator is satisfied that the axis of rotation R of the vertical boring shaft 50 is properly aligned with the central axis A of the component 12, the hydraulic clamping cylinders 140 are all activated to produce a clamping force between the upper horizontal surface 42 and the lower horizontal surface 44. The tool support base 40 is then secured in place on the center support frame 24 for proper, secure operation throughout the boring and/or facing operation of the vertical boring machine 10.

The detailed explanation of the preferred vertical boring machine should enable one skilled in the machining art to effectively produce the described boring and/or facing operations on various circular components. However, in order to better understand the preferred vertical boring machine, it is appropriate to discuss a number of dimensions of the various components thereof. For example, the preferred center support frame has a height of about 22 inches and an upper surface which is about 39 inches by 39 inches. Each of the radially extending base legs has a height of about 22 inches, a length of about 50 inches and a width of about 8 inches. The vertical boring shaft has an outside diameter of about 6 inches and an inside diameter of about 3 inches. The vertical height or length of the boring shaft is about 60 inches. The radial tool arm has a range of radial motion of about 3 to about 16 inches and can be configured through the selective installation and removal of the various sections thereof to allow the tool head to be disposed at a minimum distance of about 11 inches from the axis of rotation to a maximum distance of about 70 inches from the axis of rotation. Accordingly, the preferred vertical boring machine is capable of performing the boring and/or facing operation on components which have an effective diameter ranging from between 22 inches and 140 inches. The axial or vertical dimension of such components which may be installed on the preferred machine could range from 1 inch to about 4 feet.

The preferred tool support base is about 34 inches by 34 inches. The range of motion of the tool support base on the center support frame is about 4 inches in the X direction and about 4 inches in the Y direction. The preferred X-Y guide member has a height of about 1.88 inches. The height of the upper portion including the upper region thereof is about 1.26 inches and the length is about 2 inches. The effective width of the upper portion, at the region of the groove in the tool support base at the lower horizontal surface, is about 1 inch. The lower portion of the X-Y guide member has an effective width of about 1 inch, a height of about 0.62 inches and a length of about 2 inches. The grooves in the lower horizontal surface of the tool support base including the enlarged end are about 8 inches long. The grooves in the upper horizontal surface of the center support frame are about 6 inches long. After the vertical boring shaft is effectively aligned with the center support frame to cause the axis of rotation to be aligned with the center axis of the component, activation of each of the hydraulic clamping cylinders will produce a downward force of about 4,000 pounds in order for the tool support base to be forced into frictional engagement with the central support frame by a total of about 16,000 pounds of force.

The spindle housing which forms a rigid portion of the tool support base includes an outside diameter of about 24 inches, an inside diameter of about 19 inches and a height of about 14.5 inches. The spindle mounted for rotation within the spindle housing has an outside diameter of about 12 inches, an inside diameter of about 6 inches and a height of about 17.5 inches not including the spindle drive gear mounted on the lower end thereof. The spindle drive gear has a diameter of about 29 inches. The preferred hydraulic motor for rotating the spindle and vertical boring shaft thereon is capable of providing 7,000 inch-pounds of torque and may be selectively varied in direction and speed from 0 to 300 RPM. Consequently, the vertical boring shaft may be selectively caused to rotate through gear reduction at a speed of 0 to 20 RPM.

While the preferred vertical boring machine can provide the desired boring and/or facing as described, it should be understood that various alternatives may be made to the preferred embodiment disclosed herein without departing from the scope of invention as claimed. For example, while the preferred vertical boring machine includes means for insuring that the axis of rotation and the center axis of the component are aligned by the preferred means described hereinabove, the overall portable configuration of the preferred machine could be provided in a different form by the use of any reasonable means for aligning the center axis of the component with the axis of rotation. Additionally, while the preferred means for selectively moving the tool support base on the center support frame has been described, other means could be employed for limiting the relative movement therebetween to the X and Y directions to still allow the axis of rotation to be aligned with the center axis of the component. If the vertical boring machine includes a means for limiting the relative movement between the tool support base and the center support frame, the means for effectively producing the desired movement in the X and/or Y direction could be of an alternative configuration. As indicated hereinabove, there could be employed other means for effectively moving the spindle housing relative to the center support frame in both the X and Y directions without departing from the scope of the invention as claimed. Although the preferred machine is disposed, as defined in the claims, to include the work piece support in the horizontal direction and the tool support in the vertical direction, it should be recognized that those skilled in the art could reorient the machine to a different angle or direction to provide a mechanical equivalent of the machine as claimed and that the directions recited in the claims are not intended to limit the scope of the invention but to define the relationships between the various components.

Clearly, numerous alternative features could be provided to a vertical boring machine of the present invention without departing from the scope of the invention as claimed.

What is claimed is:

1. A vertical boring machine for boring or facing a circular region of a component having a central axis comprising:

horizontal support means for supporting the component with the central axis extending in a vertical direction;

tool support means for being disposed at the central axis to extend in said vertical direction;

means for rotating said tool support means about the central axis;

said tool support means including a tool head extending radially outwardly of the central axis;

said tool support means having tool head movement means for controlled radial movement of said tool head and for controlled axial movement of said tool head in said vertical direction;

said horizontal support means including a center support; and said tool support means being mounted on said center support for relative rotation therebetween.

2. The vertical boring machine according to claim 1, wherein said horizontal support means includes a plurality of radially extending leg elements, each of said radially extending leg elements has an upper surface, said each radially extending leg element is removably secured to said center support, and said radially extending leg elements include means for securing the component to said upper surfaces thereof.

3. The vertical boring machine according to claim 2, wherein said center support and each of said radially extending leg elements include adjustable feet elements for positioning of said upper surfaces in a horizontal plane and the central axis in said vertical direction which is perpendicular to said horizontal plane.

4. The vertical boring machine according to claim 1, further including a tool support base, wherein said tool support means is mounted for rotation about said tool support base, said means for rotating said tool support means is secured to and supported by said tool support base, and said tool support base is mounted on said center support.

5. The vertical boring machine according to claim 4, further including means for selectively moving said tool support base in an X direction and in a Y direction relative to said center support, wherein said X direction and said Y direction are in a horizontal plane and at an angle with respect to each other and said means for selectively moving said tool support base is for aligning said tool support means with the central axis.

6. The vertical boring machine according to claim 5, further including means for maintaining said tool support base in a fixed position relative to said center support after the aligning of said tool support base with the central axis to secure said tool support means at the central axis during the boring or facing of the component.

7. The vertical boring machine according to claim 5, wherein said tool support base includes lower surface means, said center support includes upper surface means, and said lower surface means and upper surface means include at least one region of sliding contact therebetween when said tool support base is mounted on said center support.

8. The vertical boring machine according to claim 7, wherein said at least one region of sliding contact between said lower surface means and said upper surface means extends in a common plane which is parallel to said horizontal plane.

9. The vertical boring machine according to claim 8, wherein said upper surface means includes an upper horizontal surface and said lower surface means includes a lower horizontal surface.

10. The vertical boring machine according to claim 9, wherein said means for selectively moving said tool support base includes at least one first groove in said upper horizontal surface which extends in said X direction and at least one second groove in said lower horizontal surface which extends in said Y direction, at least a portion of said first groove being generally aligned with said second groove, at least one X-Y guide member extending into said first groove and said second groove, and said at least one X-Y guide member having a lower portion disposed in and for sliding along said first groove and an upper portion disposed in and for sliding along said second groove.

11. The vertical boring machine according to claim 10, further including locking means for selectively maintaining said lower horizontal surface in a fixed position on said upper horizontal surface after the aligning of said tool support base with the central axis, wherein said second groove is T-shaped, said upper portion of said X-Y guide member includes an enlarged upper region for sliding, interlocking disposition within said second groove, said locking means includes means for applying a force to said X-Y guide member in a downward direction to cause said enlarged upper region within said second groove to produce frictional contact between said upper horizontal surface and said lower horizontal surface.

12. The vertical boring machine according to claim 10, wherein said means for selectively moving said tool support base includes a plurality of said X-Y guide members, a plurality of said first grooves and a plurality of said second grooves, each of said first grooves is generally aligned with a corresponding said second groove, and each of said X-Y guide members respectively extends into said each first groove and said corresponding second groove.

13. The vertical boring machine according to claim 12, wherein said plurality of said first grooves and said plurality of said second grooves are evenly spaced about said tool support means.

14. The vertical boring machine according to claim 13, wherein said plurality of said first grooves, said plurality of said second grooves, and said plurality of said X-Y guide members are substantially confined between said tool support base and said center support as said at least one region of said sliding contact of said lower horizontal surface and upper horizontal surface completely encircles said first grooves, said second grooves and said X-Y guide members.

15. The vertical boring machine according to claim 5, wherein said means for selectively moving said tool support base includes an X-adjustment means and a Y-adjustment means, said X-adjustment means including first adjustable coupling means between said center support and said tool support base for varying a relative distance therebetween in said X direction and said Y-adjustment means including second adjustable coupling means between said center support and said tool support base for varying a relative distance therebetween in said Y direction.

16. The vertical boring machine according to claim 15, wherein said first adjustable coupling means includes a rotatable screw element extending in said X direction and supported by said center support, a nut element supported by said tool support base, said rotatable screw element being operably engaged with said nut element, and means for rotating said rotatable screw element to produce movement of said nut element in said X direction.

17. The vertical boring machine according to claim 16, wherein said nut element is supported by said tool support base to allow relative movement therebetween in said Y direction.

18. A method of boring or facing a circular region of a component having a central axis, said method comprising the steps of:

supporting the component in a fixed position in a horizontal plane with the central axis extending in a vertical direction;

disposing a tool support means at the central axis to extend in said vertical direction with a tool head of said tool support means extending radially outwardly of the central axis;

rotating said tool support means about the central axis;

selectively moving said tool head in a radial direction and in an axial direction relative to the central axis to produce the boring or facing of the circular region; and said disposing said tool support means including selectively moving said tool support means, relative to the component in said fixed position, in an X direction and in a Y direction which are parallel with said horizontal plane and at an angle with respect to each other.

* * * * *